US009327912B2

(12) United States Patent
Wroblewski

(10) Patent No.: US 9,327,912 B2
(45) Date of Patent: May 3, 2016

(54) SPRING SEPARATOR

(71) Applicant: Lucien J Wroblewski, Burr Ridge, IL (US)

(72) Inventor: Lucien J Wroblewski, Burr Ridge, IL (US)

(*) Notice: Subject to any disclaimer, the term of this patent is extended or adjusted under 35 U.S.C. 154(b) by 0 days.

(21) Appl. No.: 14/637,694

(22) Filed: Mar. 4, 2015

(65) Prior Publication Data
US 2015/0251857 A1 Sep. 10, 2015

Related U.S. Application Data

(60) Provisional application No. 61/949,525, filed on Mar. 7, 2014.

(51) Int. Cl.
| B65G 47/06 | (2006.01) |
| B65G 47/12 | (2006.01) |
| B65G 51/01 | (2006.01) |
| B65G 51/02 | (2006.01) |
| B21F 35/00 | (2006.01) |

(52) U.S. Cl.
CPC ........... B65G 47/12 (2013.01); B21F 35/00 (2013.01); B65G 47/06 (2013.01); B65G 51/02 (2013.01); *B65G 2201/0232* (2013.01)

(58) Field of Classification Search
CPC ...... B65G 11/203; B65G 47/06; B65G 47/08; B65G 47/12; B65G 47/14; B65G 47/26; B65G 47/29; B65G 47/295; B65G 51/02; B65G 2201/0232

USPC .......... 198/525, 530, 532, 459.1, 459.6, 416; 221/173, 156, 163, 167
See application file for complete search history.

(56) References Cited

U.S. PATENT DOCUMENTS

| 3,452,185 A * | 6/1969 | Hanson ................. G05F 1/56 235/442 |
| 5,101,955 A * | 4/1992 | Masterton ............ H01F 27/027 198/390 |
| 6,401,909 B2 * | 6/2002 | Heigl .................. H05K 13/0434 198/468.6 |
| 7,150,349 B2 * | 12/2006 | Meynieux ............ B65G 47/1478 198/396 |
| 8,079,456 B1 * | 12/2011 | Wroblewski ............ B65G 29/00 198/392 |
| 2010/0187166 A1 * | 7/2010 | Seki ..................... B07C 5/34 209/606 |

FOREIGN PATENT DOCUMENTS

JP 63001620 A1 * 1/1988 ............. B65G 47/08

* cited by examiner

*Primary Examiner* — Mark A Deuble
(74) *Attorney, Agent, or Firm* — James N. Videbeck

(57) ABSTRACT

An end point spring separator is positioned adjacent a dispensing area of a pneumatic tube having a plurality of coil springs in serial order therethrough. The separator rotates a downstream positioned coil spring while holding stationary an adjacent upstream positioned coil spring to separate potentially entangled ends of each spring passing thereby.

9 Claims, 4 Drawing Sheets

SPRING SEPARATOR

This invention claims priority of provisional application Ser. No. 61/949,525 filed Mar. 7, 2014, the contents of which are incorporated herein by reference.

This invention relates to a device for separating entangled coil springs and, more particularly, to an end stage spring separator for separating end entangled coil springs that are already positioned in serial, generally axially aligned position.

BACKGROUND OF THE INVENTION

In order to assemble products that feature the use of springs therein, springs have to be fed from a storage position to a position adjacent an assembly line where they may be either robotically positioned or installed manually by a worker on that assembly line. Applicant has created a spring detangler that is disclosed in U.S. Pat. No. 8,079,456 in which clumps of springs received in a container mounted on a pallet are positioned in a hopper and then fed into a rotating chamber where they are separated. Thereafter, the springs are fed to a position remote from the detangler through a feed tube having a cavity therein which is slightly larger diametrically than the springs to be detangled. As a result, the springs are fed serially toward that remote location. It has become apparent that even through the coil springs are originally detangled and positioned in the vacuum tube, they may rotate therein by the vacuum forces so as to be end to end engaged, although it be an amount less entanglement than prior to their being positioned in the detangler.

A need has developed for a spring separator to act to rotate in line springs fed through a tube, whether from a spring detangler or otherwise, to separate the spring so they can be individually manipulated in a product assembly process.

SUMMARY OF THE INVENTION

The invention resides in a spring separator comprising a receiver chamber for receiving a pair of end connected springs in substantial axial alignment therein as part of a plurality of such springs. The receiver chamber includes a reciprocating stop member for engaging an upstream one of the pair of springs and stopping any motion of it. The receiving chamber further includes a rotating member for engaging a downstream one of said pair of springs. The rotating member disconnects the downward spring from said upward spring. The receiving chamber further includes a source of air pressure differentiation or gravity to move each downstream spring outwardly of the separator.

BRIEF DESCRIPTION OF THE DRAWINGS

The features of the present invention which are believed to be novel are set forth with particularity in the appended claims. The invention may best be understood from the following detailed description of a currently preferred embodiment thereof taken in conjunction with the accompanying drawings, wherein like numerals refer to like parts, and in which:

DETAILED DESCRIPTION OF THE PREFERRED EMBODIMENT

Figure 1:
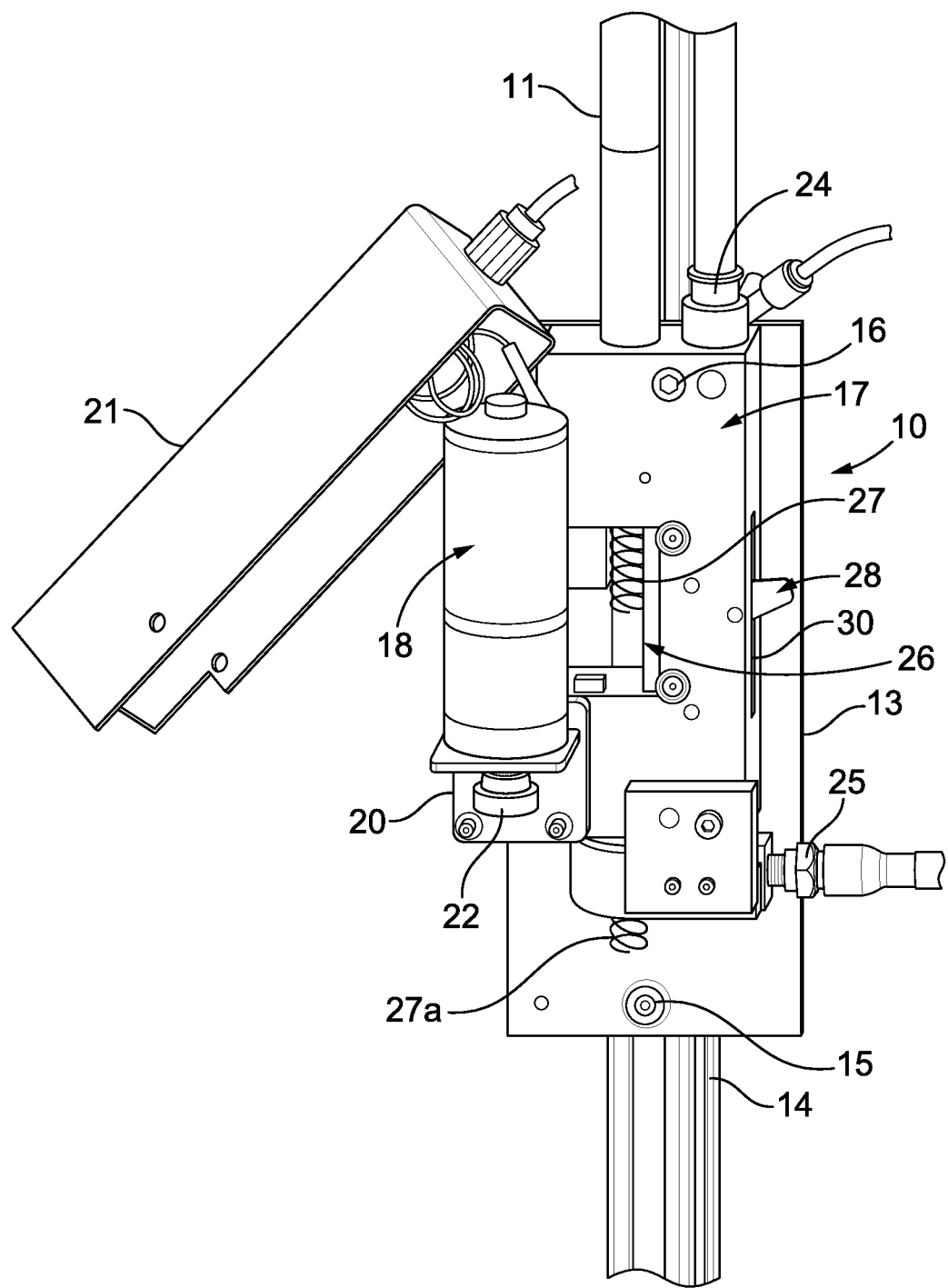
FIG. 1 is an elevational perspective view of the spring separator, constructed in accordance with the present invention, with a motor cover therefor positioned to uncover a drive motor for the spring separator.
Figure 2:
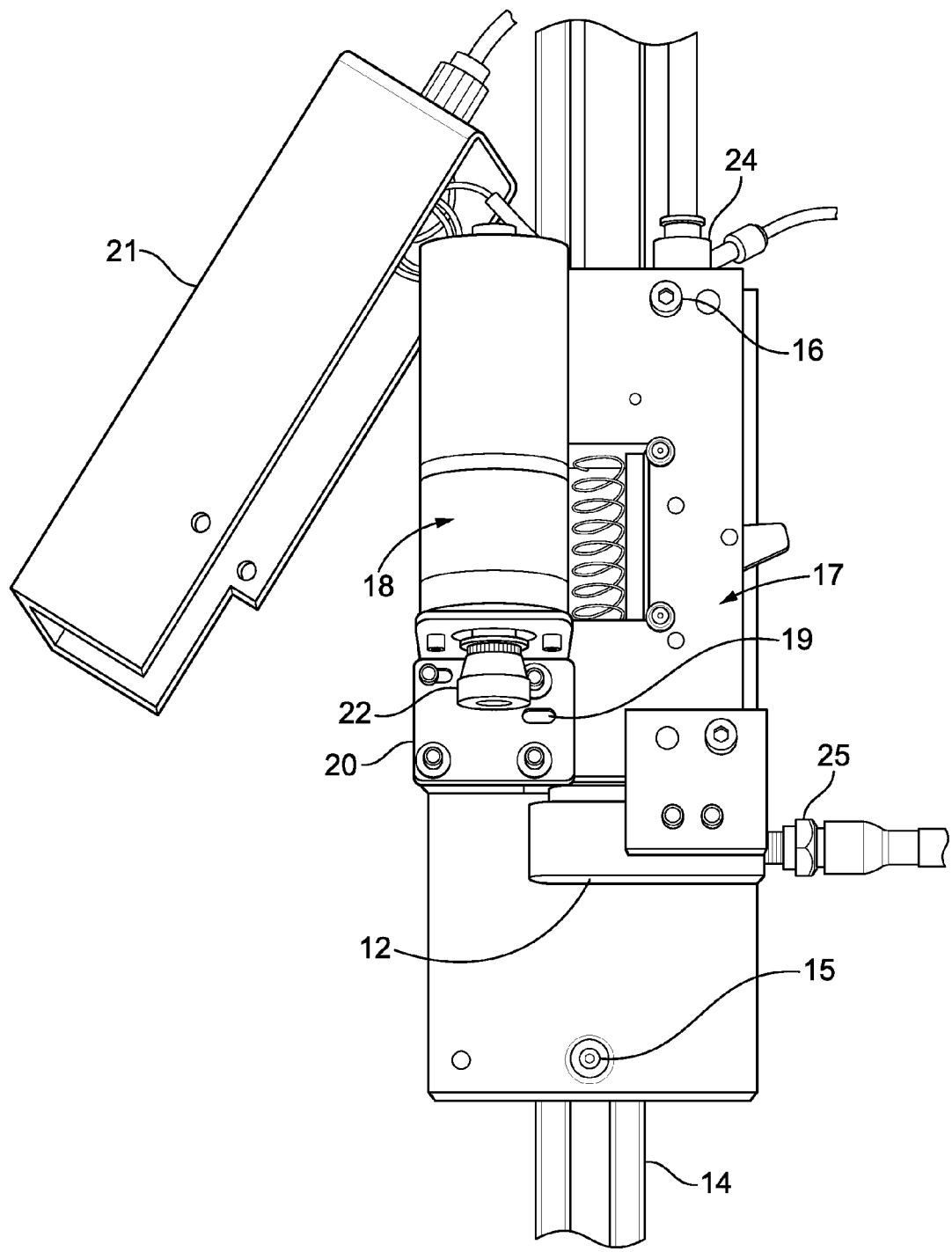
FIG. 2 is a bottom ¾ elevational view of the spring separator of the present invention showing the motor drive and showing a spring in the downstream portion of the separator.

Referring to FIGS. 1 and 2, a spring separator, generally indicated at 10, constructed in accordance with the present invention, is positioned between an inlet plastic tube 11 and an outlet 12 which would ordinarily have a plastic tube (not shown) attached to it. Spring separator 10 is mounted on its back side on a mounting plate 13 which in turn is mounted, in this embodiment, to a vertical member 14 by fasteners 15 and 16. The invention includes a housing, generally indicated at 17 which in this embodiment includes inner workings to be discussed in more detail below.

In this preferred embodiment, an electrically operated motor is generally indicated at 18. Motor 18 is mounted to the front side of the housing 17 by mounting plate 20. The motor 18 also has a removable cover 21 to shield the motor and protect same from dust and outside forces. Electric motor 18 includes a rotatable drive sheave or pulley 22 that drives an internal component of the separator by an endless belt 23, shown in FIG. 3 that extends through slots 19-19a shown in FIGS. 2 and 4.

External pneumatic sources that provide positive or negative pressure as desired are attached to the housing at 24 at the upper part of the housing and 41 (FIGS. 4 and 5) lower on the housing. Housing 17 further includes a window 26 through which movement and separation of springs such as 27 through the separator may be seen. The one arm of a triangulated actuator, 28 may be seen to move up and down in the slot 30 at one side of the housing 17. A sensor 25 detects the passage of each spring 27a after separation as it is dispensed.

Figure 3:
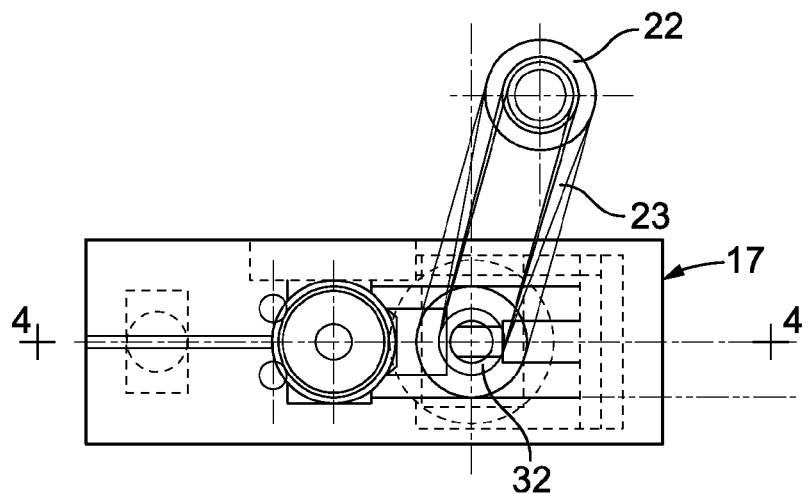
FIG. 3 is a bottom plan view of the spring separator of the present invention.
Figure 4:
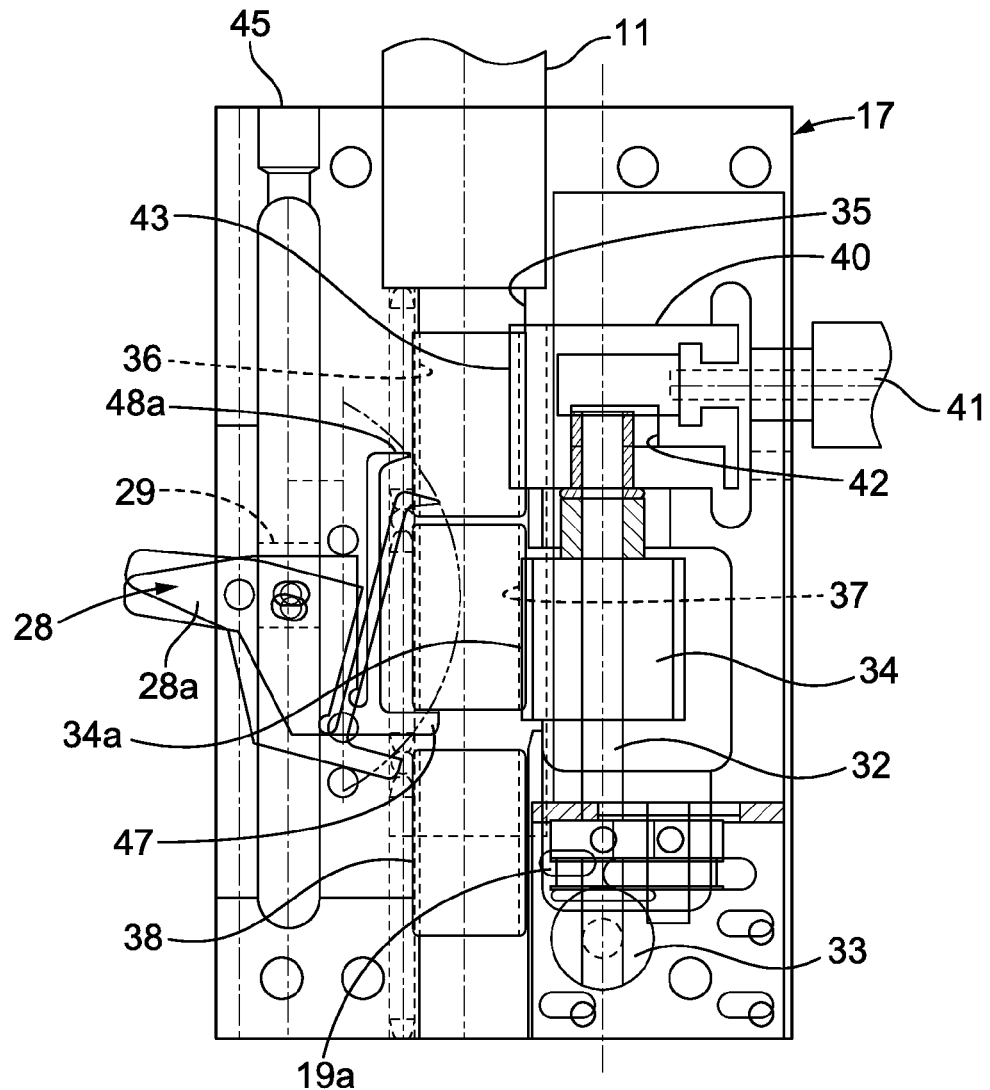
FIG. 4 is an elevational cross sectional view taken substantially along line 4-4 of FIG. 3 with the roller shown in unengaged position.
Figure 5:
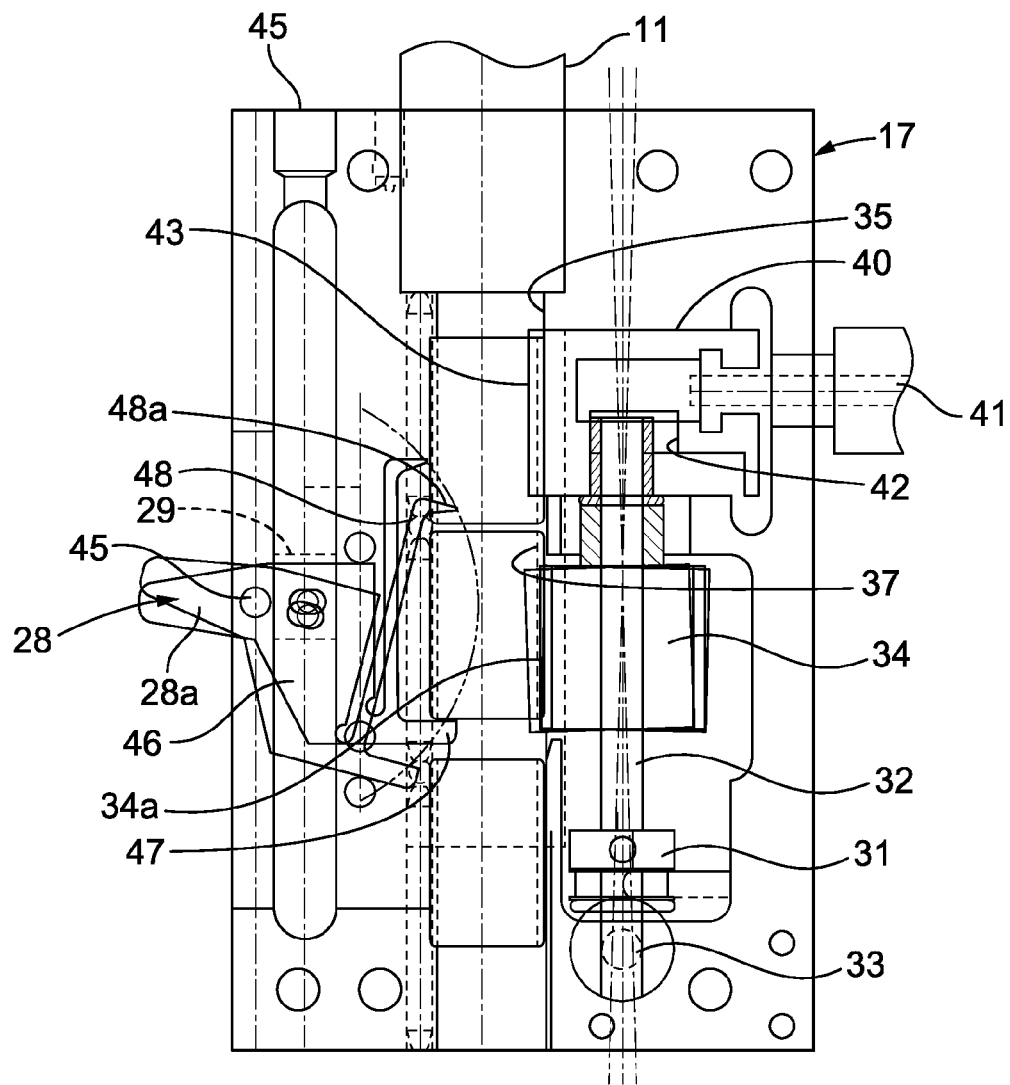
FIG. 5 is a cross sectional view similar to FIG. 4 with the roller shown in engaged position and the pivot lever shown in upward and arm of the lever at the same time.

Referring to FIGS. 3, 4 and 5, as mentioned previously, FIG. 3 shows the bottom of the housing 17 and the sheave 22 of the motor drive 18 which is connected by endless belt 23 to a second sheave 31 mounted on a rotating shaft 32 which is pivotally mounted at its bottom end at 33. A rubber coated cylinder 34 is mounted on the shaft 32. The exterior of the rubber coated cylinder 34 is positioned in communication with a central passageway 35 through housing 17. As shown most clearly in FIG. 4, cylinder 34 is pivoted at 33 and its outer surface 34a is clear of a space that would be filled by a coil spring passing through passageway 35, most clearly shown in the vertical dotted lines at 36, 37 and 38.

FIG. 5 shows the outer surface 34a of cylinder 34 rocked into a position where it will impinge on the outer surface of a spring, whose outline is shown at 37 passing through the spring passageway 35. The rocking of the shaft 32 which is pivoted at 33 is accomplished by a metal member 40 which reciprocates from left to right and back as shown in FIGS. 4 and 5 and is driven by a pneumatic pressure source through a side connection 41. A slot 42 in the bottom of reciprocating member 40 is capable of rocking the shaft 32 on its pivot point 33 in order for the reciprocating upper member 40 to contact and hold an upper spring member, denoted by outline 36. At the same time the rotating member 34 is capable of rotating a lower spring member, denoted by outline 37 to separate the upper spring member 36 from the lower spring member 37, as it may be entangled in the ends of the respective coil springs 36 and 37.

On the opposite side of the housing 17, the left side as viewed in FIGS. 3, 4 and 5, and the right side as viewed in FIGS. 1 and 2, a second pneumatic passageway 45 extends substantially vertically through the left hand side of FIGS. 4 and 5 and includes a sliding member or piston 29 that drives the triangulated pivoting member 28 first described in connection with FIGS. 1 and 2. The triangulated pivoting lever 28 is pivoted at 45 in the housing 17 and includes the external arm 28a first described in FIGS. 1 and 2, and a body 46 that includes a distal lever arm 47 which when positioned horizontally is able to capture the end of a lower spring member, denoted by outline 37. In one aspect of the present invention, a thin elongate bendable arm member 47 extends from the base of the distal end 47 perpendicularly thereto to an angled pointed end 47a which runs generally parallel to the distal arm 47 at the top of bendable arm 48.

As the triangulated member 28 pivots on its pivot point 45, distal end 47 is capable of retaining, stopping and holding the bottom end of a lower spring member denoted by outline 37, at which point the bendable arm 48 is in its upright position and not engaging the outline of the upper spring member 36. With the reciprocating part 40 positioned inwardly against the upper spring member whose outline is 36, that upper spring is stopped from rotating. The rubber covered cylindrical member 34 is then engaged as shown in FIG. 5 with the exterior of the lower spring member whose outline is shown at 37. When the cylindrical member 34 rotates, it rotates the lower spring member 37 until it is disconnected at its upper end from the lower end of the upper spring 36.

After the respective spring members are disengaged, the triangulated pivoting member 28 is rocked such that the distal end 47 rocks out of the way of the bottom spring member 37 while the pointed end 48a of the upper bendable member 48 engages the upper spring member between respective coil turns thereof. This allows the lower spring member to drop from its position once the shaft 32 is rocked outwardly as shown in FIG. 4 with the rubber covered cylinder 34 disengaging the lower spring member 37.

The use of gravity or a negative pressure in the lower outlet plastic tube (not shown) draws the lower spring 37 outwardly of the spring separator housing 17. With the triangulate member 28 again pivoted such that the distal arm 47 extends into the spring passageway, and the arm 48 being vertically out of the spring passageway, the upper spring denoted by outline 36 may drop down into the position of the previously occupied by the lower spring member whose outline is shown at 37. As springs are serially fed into the housing through the tube 11, another spring member is drawn into the position shown by the upper spring outline 36, to repeat the process of spring separation.

It should be noted that the thickness of the elongate, bendable arm member 48 of the triangulated pivoting member 28 may be varied in thickness (or diameter) to allow the pointed distal end 48a to move slightly if it should impinge on the outside of a specific spring coil to allow that slight movement to have the pointed end moved in the interstice or space between the coil turns to retain the upper coil in its vertical position when such retention is desired. It should be noted that the bendability of arm 48 is also dependent upon the size of the springs to be separated, with larger springs allowing a thicker elongate arm 48 to be utilized while smaller springs would necessitate the use of a thinner more bendable arm 48 to prevent deformation of the respective springs.

Thus, the operation of the spring separator has been shown and described. It should be noted that this spring separator may be utilized by itself if there is a means of feeding individual coils into the upper plastic tube 11. However, its original purpose is to be utilized in connection with the spring detangler shown and described in U.S. Pat. No. 8,079,456.

While one embodiment of the present invention has been shown and described, it will be apparent to those skilled in the art that many changes and modifications may be made without departing from the true spirit and scope of the present invention. It is the intent of the appended claims to cover all such changes and modifications which fall within the true spirit and scope of the invention.

What is claimed:

1. A spring separator comprising:
    a receiver chamber for receiving a pair of end connected springs in substantial axial alignment therein as part of a plurality of such springs;
    said receiver chamber including a reciprocating stop member for engaging an upstream one of said pair of springs and stopping any motion thereof;
    said receiving chamber further including a rotating member for engaging a downstream one of said pair of springs, said rotating member disconnecting said downstream spring from said upstream spring;
    said receiving chamber further including one of gravity and a source of air pressure differentiation to move each said downstream spring outwardly of said separator.

2. The spring separator as defined in claim 1 wherein:
    said stop member and said rotating member are engaged and disengaged by a single control.

3. The spring separator as defined in claim 1 further including:
    a pivoting member in communication with said receiver chamber alternately stopping said upstream spring and said downstream spring.

4. The spring separator as defined in claim 3 wherein:
    an arm of said pivot member for impinging said upstream spring is bendable to allow a distal end thereof to move into a space between coil turns if said distal end initially impinges a coil thereof.

5. The spring separator as defined in claim 1 wherein said stop member and said roller member are both mounted on a pivoting shaft.

6. The spring separator as defined in claim 1 wherein said rotating member is driven by an electrically operated motor positioned adjacent said receiver chamber.

7. The spring separator as defined in claim 6 wherein a driving connection between said motor and said rotating member is an endless belt.

8. The spring separator as defined in claim 4 wherein:
    the bendability of said arm of said pivot member is lessened for larger dimensioned spring separators than for smaller dimensioned spring separators.

9. The spring separator as defined in claim 2 wherein said single control is an air pressure source.

* * * * *